(12) United States Patent
Portell et al.

(10) Patent No.: US 8,601,150 B1
(45) Date of Patent: Dec. 3, 2013

(54) CROSS-CHANNEL DATA LINK

(75) Inventors: Lance C. Portell, St. Charles, MO (US);
Dennis W. Gvillo, Moro, IL (US);
Daniel S. Rymarz, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 475 days.

(21) Appl. No.: 12/896,514

(22) Filed: Oct. 1, 2010

(51) Int. Cl.
*G06F 15/16* (2006.01)

(52) U.S. Cl.
USPC ........................................................ 709/234

(58) Field of Classification Search
USPC ........................................................ 709/234
See application file for complete search history.

(56) References Cited

U.S. PATENT DOCUMENTS

| | | | | |
|---|---|---|---|---|
| 4,843,543 | A * | 6/1989 | Isobe | 711/148 |
| 5,303,344 | A * | 4/1994 | Yokoyama et al. | 709/230 |
| 6,134,237 | A * | 10/2000 | Brailean et al. | 370/394 |
| 6,445,717 | B1 * | 9/2002 | Gibson et al. | 370/473 |
| 6,628,613 | B1 | 9/2003 | Joung et al. | |
| 6,636,790 | B1 * | 10/2003 | Lightner et al. | 701/31.5 |
| 6,904,040 | B2 * | 6/2005 | Salapura et al. | 370/395.32 |
| 6,929,220 | B2 * | 8/2005 | Lloyd | 244/129.1 |
| 7,681,072 | B1 * | 3/2010 | Gibson et al. | 714/6.22 |
| 7,689,594 | B2 | 3/2010 | Davidson et al. | |
| 7,873,747 | B2 * | 1/2011 | Kim | 709/247 |
| 2002/0083182 | A1 * | 6/2002 | Alvarado et al. | 709/231 |
| 2002/0091850 | A1 * | 7/2002 | Perholtz et al. | 709/231 |
| 2003/0108044 | A1 * | 6/2003 | Hendel | 370/392 |
| 2004/0042486 | A1 * | 3/2004 | Onno et al. | 370/466 |
| 2006/0215568 | A1 | 9/2006 | Smith | |
| 2008/0205416 | A1 | 8/2008 | DeChiara | |
| 2009/0106441 | A1 * | 4/2009 | Zuckerman et al. | 709/231 |
| 2009/0259800 | A1 * | 10/2009 | Kilzer et al. | 711/103 |
| 2009/0323726 | A1 * | 12/2009 | Ochi et al. | 370/498 |

OTHER PUBLICATIONS

Wang et al., Development of Flight Control System Using Embedded Computer PC-104, 26th International Congress of the Aeronautical Sciences, 2008, (5 pgs).
Zwaenepoel, Protocols for Large Data Transfers Over Local Networks, Rice University—Department of Computer Science, Houston, Texas, 1985, (11 pgs).
Younis et al., Integrating Redundancy Management and Real-time Services for Ultra Reliable Control Systems, Honeywell International Inc., Columbia, Maryland, 2001, (7 pgs).

* cited by examiner

*Primary Examiner* — Lynn Feild
*Assistant Examiner* — Bryan Lee
(74) *Attorney, Agent, or Firm* — Toler Law Group, PC

(57) ABSTRACT

A particular method includes sending outgoing data in a first outgoing data block from a first processing system to a second processing system. The method also includes updating a first data structure at the first processing system. The first data structure indicates an order of transmission of the first outgoing data block relative to one or more other outgoing data blocks. When a first frame ends, an outgoing caboose packet is generated based on the first data structure. The outgoing caboose packet including information identifying the order of transmission of the first outgoing data block and the one or more other outgoing data blocks during the first frame. The method also includes sending the outgoing caboose packet from the first processing system to the second processing system.

18 Claims, 5 Drawing Sheets

CROSS-CHANNEL DATA LINK

FIELD OF THE DISCLOSURE

The present disclosure is generally related to a cross-channel data link.

BACKGROUND

In certain systems, cross-channel data links are used to provide communications between redundant or parallel processing systems. One concern with cross-channel data links is that a large amount of data may be replicated for communication between the processing systems. For example, a first processing system may generate or receive data, duplicate the data for transmission, and transmit the data to a second processing system. The second processing system may receive the data in a storage buffer, copy the data to a storage memory and a when a complete set of data is received, copy the complete set of data into yet another storage location. Additionally, when the data is to be used, the receiving system may generate another copy to be used by a processing module. A significant amount of resources may be required for data replication in such cross-channel data links. Additionally, in certain processing systems, each time that data is received an interrupt may be generated in order to generate a copy of the received data, which can further reduce a total processing power available for the processing systems.

SUMMARY

A particular method includes sending outgoing data in a first outgoing data block from a first processing system to a second processing system. The method also includes updating a first data structure at the first processing system. The first data structure indicates an order of transmission of the first outgoing data block relative to one or more other outgoing data blocks. When a first frame ends, an outgoing caboose packet is generated based on the first data structure. The outgoing caboose packet includes information identifying the order of transmission of the first outgoing data block and the one or more other outgoing data blocks during the first frame. The method also includes sending the outgoing caboose packet from the first processing system to the second processing system.

A particular system includes a first processing system and a second processing system. The second processing system includes a processor and a receive buffer. The receive buffer includes a plurality of receive buffer memory locations. The second processing system also includes a receiver configured to receive incoming data blocks from the first processing system and to write each of the incoming data blocks to a receive buffer memory location. The receiver is also configured to receive a caboose packet from the first processing system. The second processing system also includes a memory mapping module to generate, based on the caboose packet, a map associating the receive buffer memory locations with data written to each of the receive buffer memory locations.

A particular moveable platform includes a plurality of platform management systems and a cross-channel data link that facilitates communication of state information between the platform management systems. A first platform management system is configured to send first data blocks to at least one second platform management system via the cross-channel data link. The first platform management system is also configured to send a first caboose packet via the cross-channel data link to the at least one second platform management system when a frame ends. The first caboose packet includes information indicating an order of transmission of the first data blocks and information descriptive of content of each of the first data blocks. At least one second platform management system is configured to receive the first data blocks from the first platform management system and to store the first data blocks to memory locations of a receive buffer of the at least one second platform management system. The at least one second platform management system is further configured to receive the first caboose packet from the first platform management system and to use the first caboose packet to map the memory locations of the receive buffer of the at least one second platform management system to the content of each of the first data blocks.

The features, functions, and advantages that have been described can be achieved independently in various embodiments or may be combined in yet other embodiments, further details of which are disclosed with reference to the following description and drawings.

DETAILED DESCRIPTION

Figure 1:
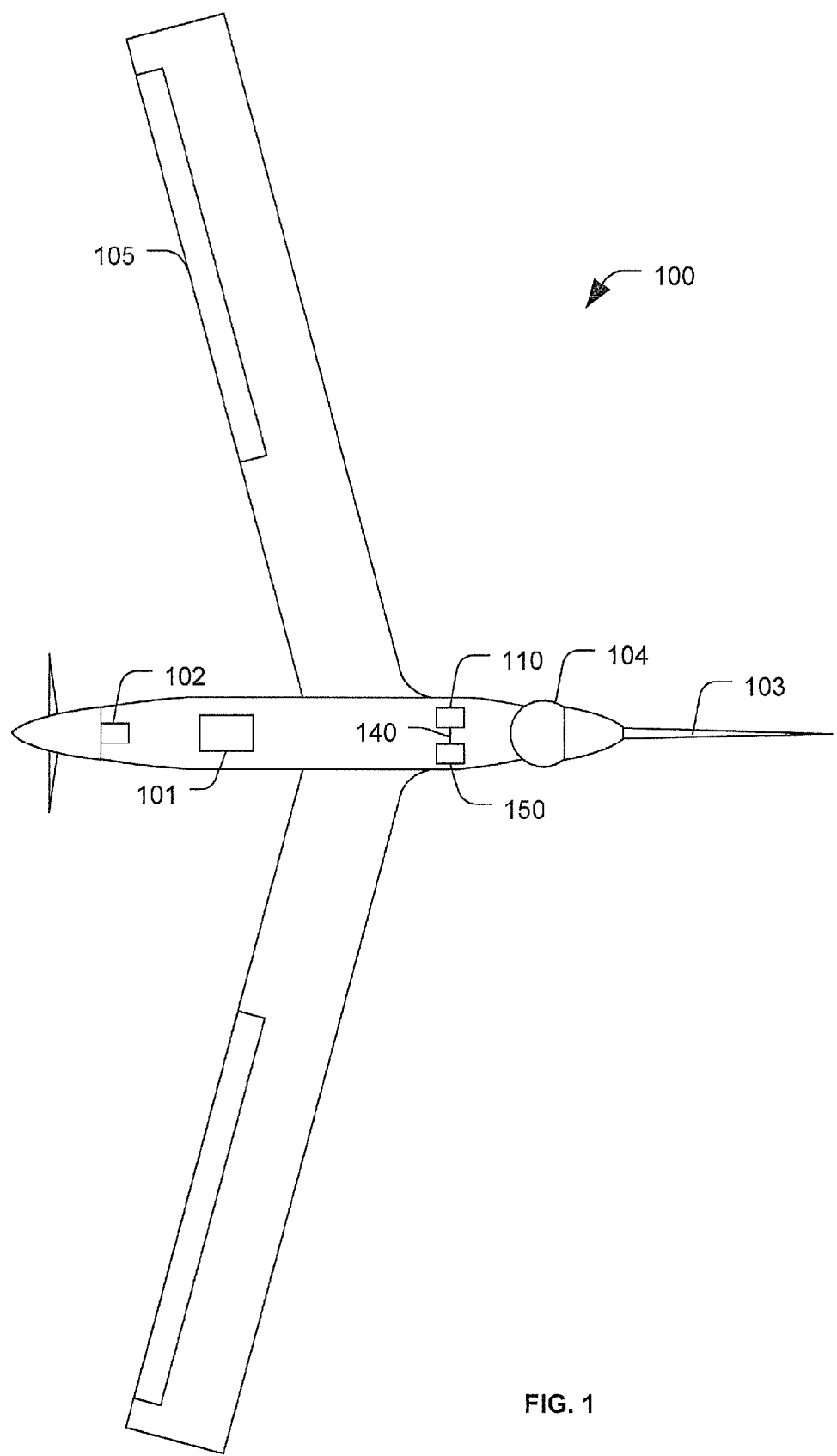
FIG. 1 is an illustration of particular embodiment of a system with a cross-channel data link.

In a particular embodiment, a cross-channel data link system is provided. The cross-channel data link system may use a standard communication protocol, such as an Ethernet protocol. For example, a first processing system and at least one second processing system may communicate via a gigabyte Ethernet cross-channel data link. In a particular embodiment, the first processing system and the at least one second processing system operate independently and in parallel.

The first processing system may receive data, process the data and generate packetized chunks of data that are transmitted to the at least one second processing system. The data may be packetized in blocks of a predetermined size. For example, for Ethernet communications, the data may be packetized into blocks of approximately 2000 bytes. However, other data block sizes may be used.

The first processing system may concurrently receive data blocks from the at least one second processing system. For example, data blocks received from the at least one second processing system may include results of processing that occurs at the at least one second processing system.

After the first processing system transmits the data, the first processing system may update a caboose data structure. The caboose data structure may include information about an order and timing in which the data blocks were transmitted from the first processing system to the at least one second processing system. The caboose data structure may identify a type of the data that was transmitted in each data block. At the end of a processing frame, the first processing system may send a caboose packet. The caboose packet may include information from the caboose data structure. For example, the caboose packet may provide information to the at least one second processing system about the order in which particular information was sent in various data blocks.

The first processing system may receive a data block and a second caboose packet from the at least one second processing system. The second caboose packet may include information indicating the order and type of data transmitted by the second processing system to the first processing system during the processing frame. In a particular embodiment, the first processing system receives data from the second processing system in data blocks and stores the data blocks in designated memory locations as they are received. In particular embodiments, the designated memory locations may be contiguous.

The first processing system may use the second caboose packet received from the second processing system to generate a memory map. The memory map may map particular types of data to one or more corresponding memory locations. For example, when a processing module of the first processing system needs particular data that was sent from the second processing system, the processing module may access the memory map and read the particular data directly from the corresponding memory locations to which it was stored when it was received from the second processing system. Accordingly, a total number of processor interrupts at the first processing system may be reduced, since interrupts for cross-channel data link communications may be generated only in response to the caboose packet. Additionally, duplication of data packets may be reduced since data is received from the second processing system and stored into a memory location (such as a receive buffer) immediately by the first processing system and is not duplicated until a local copy is generated by the processing module that utilizes the data.

When the data that is utilized by the processing module is split over multiple data blocks, the multiple data blocks may be stored in multiple memory locations. The first processing system may use the memory map to reconstruct the data from the multiple memory locations only in response to the processing module requesting the data. That is, no copy of the data is generated before a read request for the data is received from a particular processing module. Thus, the first processing system maintains one copy of received data from the second processing system until that data is requested by the processing module.

FIG. 1 depicts a first particular embodiment of a system that includes two or more processing systems that communicate via a cross-channel data link. The system is illustrated as an aircraft 100; however, the system may be another moveable platform (such as a satellite, a ship, a land based vehicle, a submarine, etc.) or a stationary platform. For example, the system may include an unmanned vehicle, such as an unmanned aerial vehicle (UAV), an unmanned underwater vehicle, (UUV), an unmanned space vehicle, an unmanned land-based vehicle, an unmanned water-based vehicle, or any combination thereof.

The aircraft 100 includes a first processing system 110 and a second processing system 150 that communicate via a cross-channel data link 140. In a particular embodiment, the processing systems 110 and 150 include vehicle management systems adapted to perform processing for the aircraft 100 to provide onboard autonomous control or augmented control of the aircraft 100. For example, the processing systems 110 and 150 may be adapted to provide fly-by-wire control for the aircraft 100, or remote or autonomous operation of the aircraft 100.

In a particular embodiment, the first processing system 110 and the second processing system 150 operate in parallel to provide controls and processing for the aircraft 100. In another particular embodiment, the processing systems 110 and 150 are redundant. That is, the first processing system 110 may be a primary vehicle management system for the aircraft 100 and the second processing system 150 may be a secondary or backup vehicle management system.

The cross-channel data link 140 may be used to communicate data between the first processing system 110 and the second processing system 150. For example, the cross-channel data link 140 may be used to communicate state or status update information between the processing systems 110 and 150. In another example, the cross-channel data link 140 may be used to communicate sensing data between the processing systems 110 and 150 for purposes of selecting particular data for further processing. To illustrate, a sensor 103 may provide sensing data to one or both of the processing systems 110 and 150. The processing systems 110 and 150 may communicate via the cross-channel data link 140 to select (e.g., by a voting process) particular sensed data value to use for processing purposes.

In a particular embodiment, the processing systems 110 and 150 are used to control a payload, such as a camera 104. The processing systems 110 and 150 may also receive and process data from the payload. To illustrate, a camera sensor of the camera 104 may provide data to the processing systems 110 and 150 which may process data and communicate with one another via the cross-channel data link 140. The processing systems 110 and 150 may also control other aspects or portions of the aircraft, such as one or more flight control surfaces 105, one or more engines 102, mission control logic 101, brakes, wheels, or other components or other aspects of the aircraft 100.

In operation, the processing systems 110 and 150 may communicate state information via the cross-channel data link 140. The state information may include information to enable restarting one of the processing systems 110 or 150 in the event of a failure or error of a particular processing system 110 or 150. For example, the first processing system 110 may send first data blocks to the second processing system 150 via the cross-channel data link 140. The first processing system 110 may also send a first caboose packet via the cross-channel data link 140 to the second processing system 150 when a frame ends. The frame refers to a particular period of time during which processing or data exchange occurs. For example, the frame may include a processing frame or a data link frame. The first caboose packet may include information indicating an order of transmission of the first data blocks and information descriptive of content of each of the first data blocks.

The second processing system 150 may be configured to receive the first data blocks from the first processing system 110 and to store the first data blocks to memory locations of a receive buffer of the second processing system 150. The second processing system 150 may receive the first caboose packet from the first processing system 110 and use the first caboose packet to map the memory locations of the receive buffer of the second processing system 150 to the content of each of the first data blocks. The second processing system 150 may not reconstruct the content of any of the first data blocks until a read request for the content is received.

The second processing system 150 may also be configured to send second data blocks to the first processing system 110 via the cross-channel data link 140 during the frame. The second processing system 150 may send a second caboose packet via the cross-channel data link 140 to the first processing system when the frame ends. The second caboose packet may include information indicating an order of transmission of the second data blocks and information descriptive of content of each of the second data blocks.

The first processing system 110 may be further configured to receive the second data blocks from the second processing system 150 and to store the second data blocks to memory locations of a receive buffer of the first processing system 110. The first processing system 110 may also be configured to receive the second caboose packet from the second processing system 150 and to use the second caboose packet to map the memory locations of the receive buffer of the first processing system 110 to the content of each of the second data blocks.

Accordingly, the first processing system 110 and the second processing system 150 may communicate via the cross-channel data link 140 in a manner that only interrupts processors of the processing systems 110 and 150 in response to receipt of caboose packets. Using the cross-channel data link 140 in the manner described may reduce duplication of data packets since data received from the second processing system 150 is stored in a memory location by the first processing system 110 and is not duplicated until a read request for the data is received.

Figure 2:
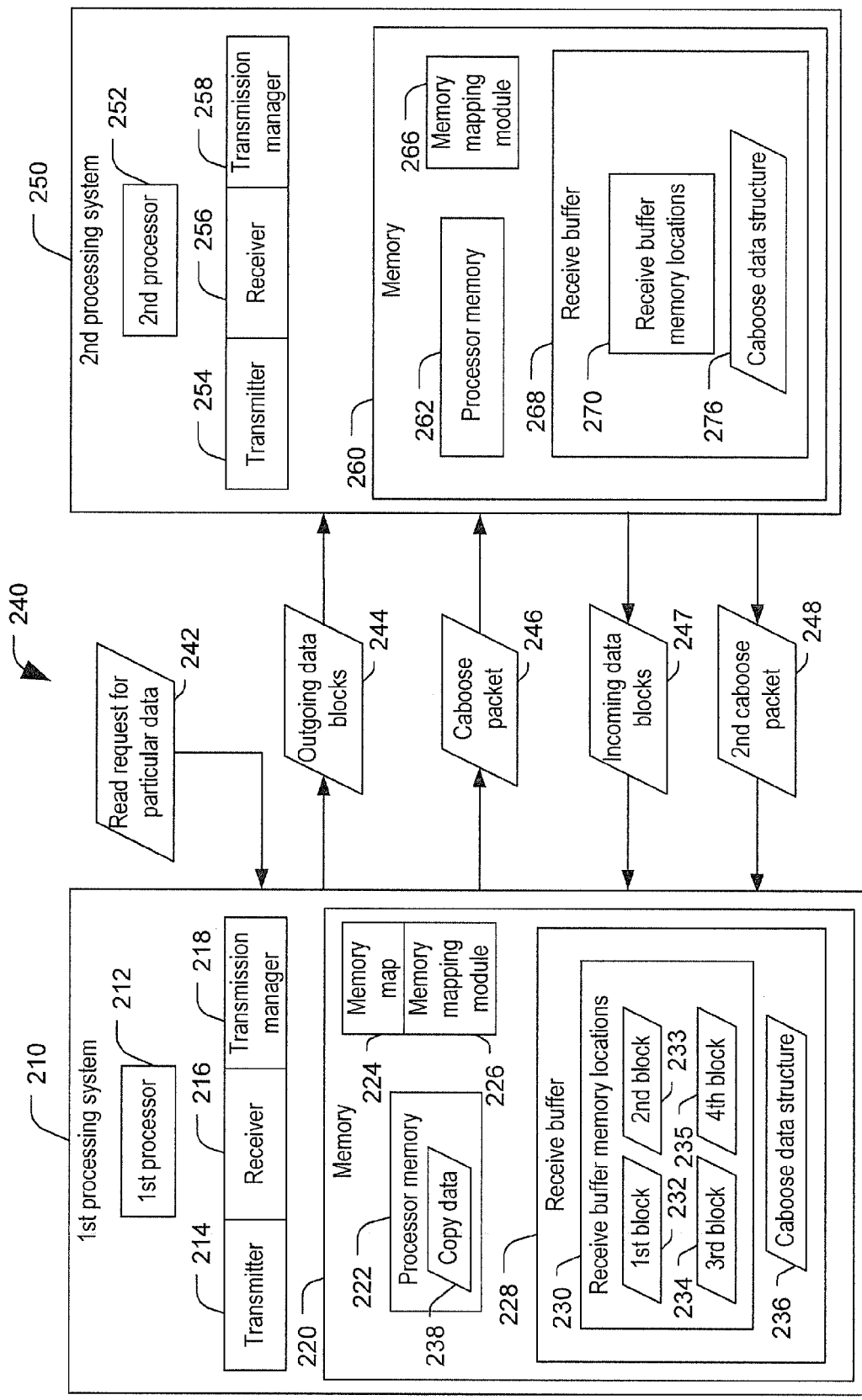
FIG. 2 is a block diagram of a computing system with a cross-channel data link.

FIG. 2 is a block diagram of a particular embodiment of a system to communicate data via a cross-channel data link. The system includes a first processing system 210 coupled to a second processing system 250 via a cross-channel data link 240. In a particular embodiment, the first processing system 210, the second processing system 250, and the cross-channel data link 240 correspond, respectively, to the first processing system 110, the second processing system 150 and the cross-channel data link 140 of FIG. 1.

The first processing system 210 includes a first processor 212, a transmitter 214, a receiver 216, and a transmission manager 218. The first processing system 210 also includes a memory 220. The second processing system 250 may include a second processor 252, a transmitter 254, a receiver 256, a transmission manager 258, and a memory 260. The memories 220, 260 may each include a processor memory 222, 262 and a receive buffer 228, 268. A receive buffer 228, 268 may be a memory area accessible by the receiver 216, 256 to store data blocks as the data blocks are received, without further processing. For example, the receive buffers 228, 268 may each include a plurality of receive buffer memory locations 230, 270. The receive buffer memory locations 230, 270 may be areas accessible by the receivers 216, 256 to substantially immediately write data blocks that are received without interrupting the processors 212, 252.

Each of the memories 220, 260 may also include an area for storing a caboose data structure 236, 276. The caboose data structure 236, 276 may include information identifying an order in which data packets are transmitted by each processing system 210, 250 via the cross-channel data link 240. Each of the transmission managers 218, 258 may update its caboose data structure 236, 276 when the associated transmitter 214, 254 transmits a data block. In a particular embodiment, the transmitters 214, 254 and receivers 216, 256 may be adapted to communicate using standard protocols such as Ethernet protocols, TCP/IP, UDP, or other standard high speed protocols.

In operation, the first processing system 210 may generate or receive data that is to be transmitted to the second processing system 250. For example, the data may include sensor data that is to be voted on by the processing systems 210, 250 to determine value to be used for further processing. To illustrate, when two or more sensors are in disagreement (i.e., the sensors are outputting sensed values that are not in agreement or are not compatible with one another) the processing systems 210, 250 may chose a particular sensed value by a voting process, such as selecting a mean value, selecting a median value, selecting a mode value, selecting a value using another averaging protocol, selecting a value based on prior expectations (e.g., a default value or an expected value), or any combination thereof. In another example, the data may include state data related to operation of the first processing system 210 that is to be transmitted to the second processing system 250 to enable restart of the first processing system 210 in the event of failure of the first processing system 210 or to enable the second processing system 250 to take over processing responsibilities of the first processing system 210.

The transmitter 214 may packetize the data into outgoing data blocks 244 and transmit the outgoing data blocks 244 from the first processing system 210 to the second processing system 250. The transmission manager 218 may update the caboose data structure 236 to indicate an order of transmission and contents of the outgoing data blocks 244.

The second processing system 250 may also generate and transmit data blocks, illustrated as incoming data blocks 247 to the first processing system 210, which may be received by the receiver 216 of the first processing system 210. The outgoing data blocks 244 from the first processing system 210 to the second processing system 250 may be received by the receiver 256 of the second processing system 250. The receiver 256 may store the outgoing data blocks 244 at the receive buffer memory locations 270.

When a frame ends (e.g., a data link frame or a processing frame), the first processing system 210 may generate a caboose packet 246 based on the caboose data structure 236 of the first processing system 210. The caboose packet 246 may be transmitted to the second processing system 250. The caboose packet 246 may include information identifying an order of transmission and content of the outgoing data blocks 244. The second processing system 250 may use the caboose packet 246 to identify locations of the receive buffer memory locations 270 of particular data.

Additionally, at the end of the frame, the second processing system 250 may transmit a second caboose packet 248 to the first processing system 210. The second caboose packet 248 may include information identifying the order of transmission of incoming data blocks 247 to the first processing system 210. Thus, the first processing system 210 may use the second caboose packet 248 to map the receive buffer memory locations 230 of the receive buffer 228 to particular content of the incoming data blocks 247. For example, the first processing system 210 may include a memory mapping module 226, and the second processing system 250 may include a second memory mapping module 266. The memory mapping module 226 of the first processing system 210 may use the second caboose packet 248 to generate a memory map 224. The memory map 224 may include information indicating content of particular receive buffer memory locations 230. To illustrate, a first data block 232 of the incoming data blocks 247 may be stored at a first receive buffer memory location, a second data block 233 may be stored at a second receive buffer memory location, a third data block 234 may be stored at a third receive buffer memory location, and a fourth data block 235 may be stored at a fourth receive buffer memory location. The data blocks 232-235 may be stored at the corresponding receive buffer memory locations 230 based on an order in which the incoming data blocks 247 were received. The second caboose packet 248 may be used to map a transmission order of the incoming data blocks 247 from the second processing system 250 to content of the data blocks 232-235. Thus, the memory map 224 may be used to map contents of one of more data blocks 232-235 to the corresponding receive buffer memory locations 230. Copies of the data blocks 232-235 or data within the data blocks 232-235 do not need to be made. The second memory mapping module 266 of the second processing system 250 may use the first caboose packet 246 to generate a memory map (not shown) related to the outgoing data blocks 244 received at the second processing system 250.

When a read request for particular data 242 is received by the first processing system 210, the first processor 212 may access the memory map 224 to identify one or more locations within the receive buffer 228 of the particular data and may generate the copy of the data block 238 in the processor memory area 222. Thus, data received from the second processing system 250 via the incoming data blocks 247 may not be copied until the read request for the particular data 242 is received. Rather, the data blocks 232-235 may be stored in receive buffer memory locations and may be mapped using the second caboose packet 248 received from the second processing system 250 to identify locations within the receive buffer memory 228 of the particular data.

In a particular embodiment, the second processing system 250 may also receive the outgoing data blocks 244 from the first processing system 210. The second processing system 250 may save the outgoing data blocks 244 to receive buffer memory locations 270 of the second processing system 250. The second processing system 250 may also receive the first caboose packet 246 from the first processing system 210. The second processing system 250 may use the first caboose packet 246 to map contents of the receive buffer memory locations 270 of the second processing system 250 to contents of data stored in each.

In systems that generate large amounts of data to be communicated between several processors (such as the first processing system 210 and the second processing system 250) via a cross-channel data link, standard Ethernet protocols may be used to transmit the data. However, in general, communications using standard protocols involves generating copies of the data after receiving the data via the cross-channel data link. For example, when the data is packetized into data blocks for Ethernet communications, the related data may be split up between several data blocks. On the receive side, the data blocks that include related data may be copied to a location in order to consolidate the related data into a single memory location. Additional copies of the data may also be generated after a particular period of transmission or after a particular frame has ended in order to consolidate or relocate data that are related based on other characteristics such as the processing frame in which they were generated. However, embodiments disclosed herein may reduce the number of copies of data that are made since data is stored in a receive buffer until a read request for the data is received.

Generating copies of data after reception may require interrupting the processor, which can significantly reduce processing capacity of the system. Embodiments disclosed herein, enable large amounts of data to be passed via data blocks using standard protocols without interrupting the processor to generate copies upon reception of the data blocks. Thus, a significant amount of processing capacity and processor time may be saved. To illustrate the system described may enable two vehicle management system computers to synchronize data and execution during a particular frame. The two vehicle management system computers may share large amounts of data over a short period of time using a cross-channel data link.

In a particular embodiment, the vehicle management system computers communicate using Ethernet protocol data blocks, such as two thousand byte data blocks, to communicate data via the cross-channel data link. Processing frames of the vehicle management system computers may be broken into cross-channel data link frames during which data is exchanged between the vehicle management system computers. At the end of a cross-channel data link frame, the vehicle management system computers may exchange caboose packets which may interrupt processors of the vehicle management system computers in order to generate a memory map of all of the data blocks that were exchanged during the cross-channel data link frame.

Figure 3:
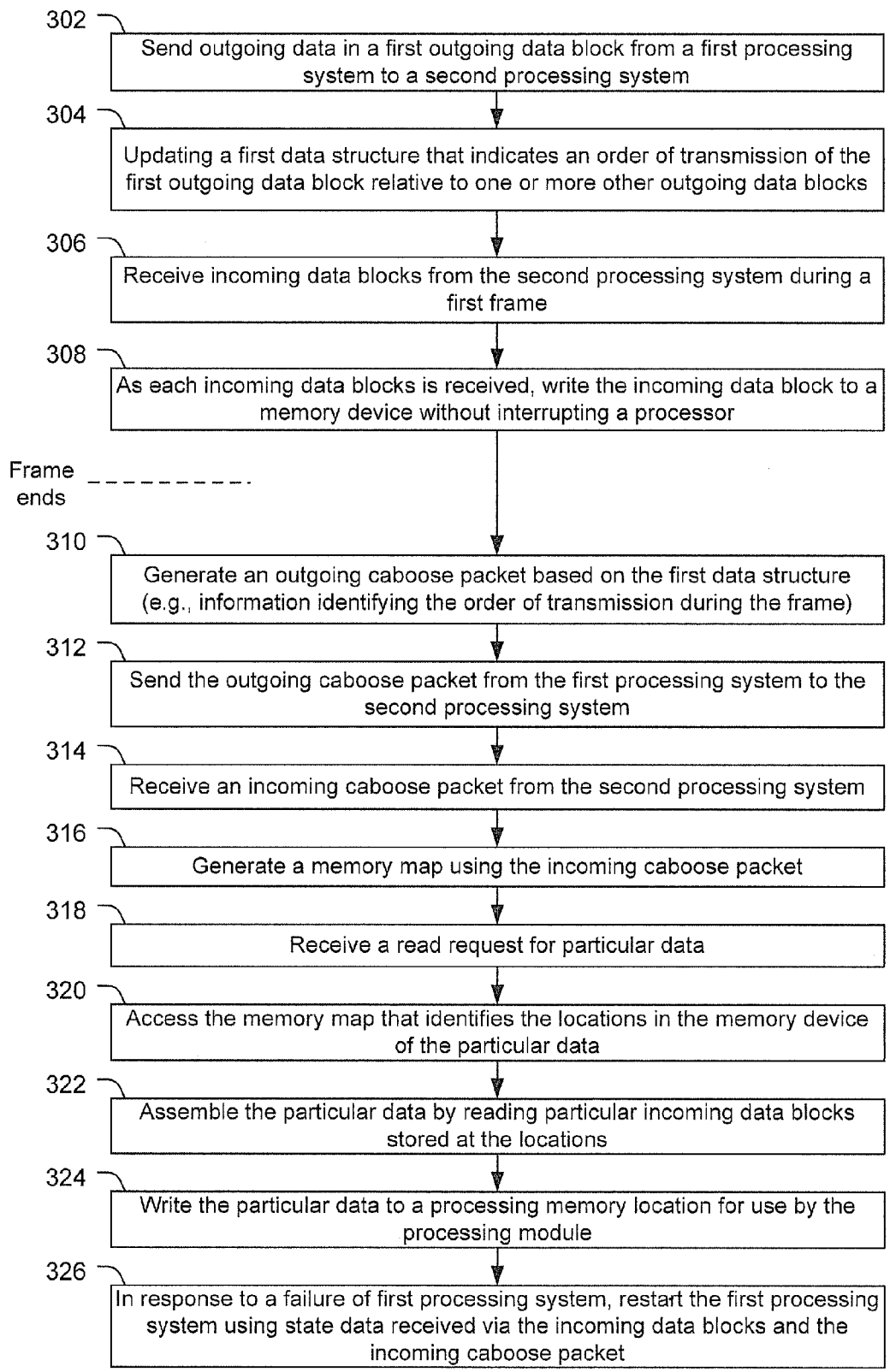
FIG. 3 is flowchart of a particular embodiment of a method of implementing a cross-channel data link.

FIG. 3 is flowchart of a particular embodiment of a method of communicating data between processing systems via a cross-channel data link. The method includes, at 302, sending outgoing data in a first outgoing data block from a first processing system to a second processing system. For example, the first processing system 210 of FIG. 2 may send outgoing data blocks 244 to the second processing system 250. The method also includes, at 304, updating a first data structure that indicates an order of transmission of the first outgoing data blocks relative to one or more other outgoing data blocks. For example, the first processing system 210 of FIG. 2 may update the caboose data structure 236 to indicate the order of transmission of the outgoing data blocks 244.

The method also includes, at 306, receiving incoming data blocks from the second processing system during a first frame. As each incoming data block is received, at 308, the incoming data block may be written to a memory device without interrupting a processor of the first processing system. For example, the incoming data blocks 247 may be written to a receive buffer memory location 230 of FIG. 2. Related incoming data blocks may be written to contiguous receive buffer memory locations of the memory device.

After the first frame ends, the first processing system may generate an outgoing caboose packet based on the first data structure, at 310. For example, the first data structure may identify the order of transmission of data blocks during the first frame. The caboose packet may include information identifying the order of transmission of the data blocks during the first frame. The outgoing caboose packet may be sent from the first processing system to the second processing system, at 312. An incoming caboose packet may be received, at 314, from the second processing system. A memory map may be generated, at 316, using the incoming caboose packet. The memory map may indicate locations within the memory device of particular data based on the order of transmission of the incoming data blocks and the information descriptive of each of the incoming data blocks. For example, the incoming caboose packet may indicate an order of transmission of data blocks from the second processing system to the first processing system. Thus, by determining where particular data blocks were stored in the received buffer, the caboose packet may be used to map content of the receive buffer memory locations to particular data contained in the receive buffer memory locations based on the content of the data blocks in order of the transmission of the data blocks.

When a read request is received for particular data, at 318, the first processing system may access the memory map, at 320. The particular data requested in the read request may be assembled by reading particular incoming data blocks from memory locations at which they are stored, at 322. The particular data may be copied to a processor memory by writing, at 324, the particular data to the processing memory location for use by a processing module.

In response to a failure of the first processing system, at 326, the first processing system may be restarted using state data received via incoming data blocks from the second processing system.

In a particular embodiment, two or more frames are used to communicate data between the first processing system and the second processing system. For example, a first frame may be used to select data to be processed during a subsequent frame. The subsequent frame may be used to perform processing using the selected data. For example, the outgoing data may be generated during a processing frame that includes a first frame and at least one second frame. The first frame and the at least one second frame may be cross-channel data link frames. During a first cross-channel data link frame, data may be selected for processing. During one or more second cross-channel data link frames, the data may be processed and communicated between the first and second processing systems.

Figure 4:
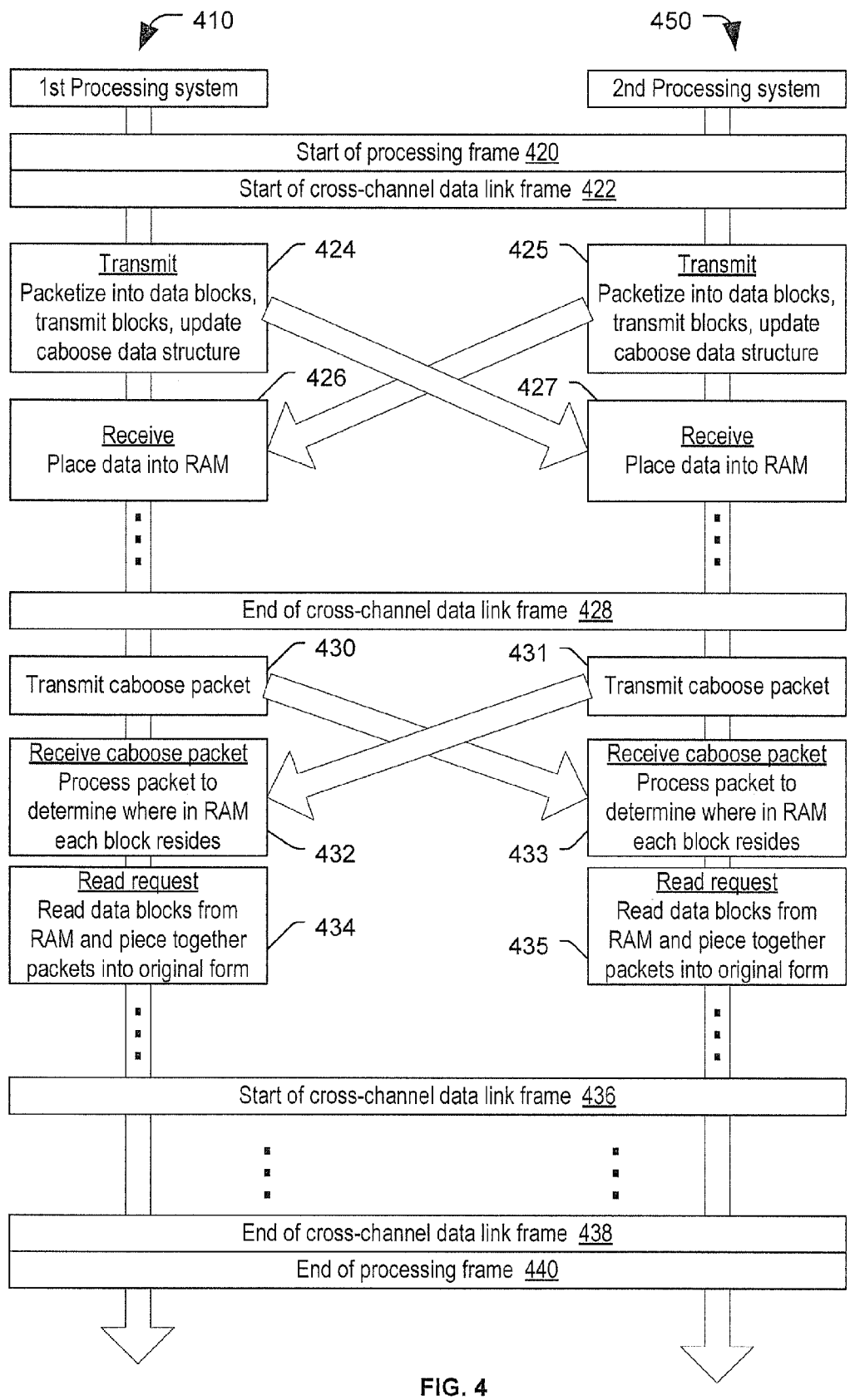
FIG. 4 is a diagram illustrating a particular embodiment of a method of implementing a cross-channel data link.

FIG. 4 is a diagram illustrating a particular embodiment of a method of implementing a cross-channel data link. A first processing system 410 and a second processing system 450 are illustrated; however, additional processing systems may be present. In a particular embodiment, the first processing system 410 and the second processing system 450 communicate data via a cross-channel data link. The cross-channel data link may utilize standard Ethernet protocols, such as TCP/IP, UDP, other protocols, or any combination thereof. The processing systems 410 and 450 may process data in processing frames, such as a first processing frame that starts at 420. Each processing frame may include one or more cross-channel data link frames, such as a first cross-channel data link frame that starts at 422.

During the first cross-channel data link frame, the first processing system 410 may receive data or perform processing steps to generate data. At 424, the first processing system 410 may transmit the data via the cross-channel data link to the second processing system 450. For example, the first processing system 410 may packetize the data into data blocks and transmit the data blocks via the cross-channel data link to the second processing system 450. The first processing system 410 may also update a caboose data structure to indicate an order of transmission and content of the data blocks.

Likewise, the second processing system 450 may receive or generate data via processing steps and may, at 425, transmit the data via the cross-channel data link to the first processing system 410. The second processing system 450 may packetize the data into data blocks and transmit the data blocks to the first processing system 410. Additionally, the second processing system 450 may update a caboose data structure at the second processing system 450 to indicate an order and content of the data blocks that were transmitted by the second processing system 450.

At 426, the first processing system 410 may receive the data blocks transmitted from the second processing system 450. When the data blocks are received, the first processing system 410 may store each data block into RAM of a receive buffer. For example, the first processing system 410 may place the data into the RAM without interrupting a processor of the first processing system 410. At 427, the second processing system 450 may receive the data blocks transmitted from the first processing system 410. The second processing system 450 may store the data blocks in a receive buffer in RAM of the second processing system 450 without interrupting a processor of the second processing system 450.

Data blocks may continue to be sent and received by the first processing system 410 and by the second processing system 450 until an end of the cross-channel data link frame, at 428. After the end of the cross-channel data link frame, the first processing system 410 may, at 430, transmit a caboose packet to the second processing system 450. The caboose packet may be based on the caboose data structure updated by the first processing system 410. The caboose packet may indicate an order of transmission of the data blocks sent from the first processing system 410 to the second processing system 450. Additionally, the first caboose packet may include information indicating content of each data block. For example, the caboose packet may indicate when two or more data blocks are related to particular information and an order in which the data blocks were transmitted. To illustrate, when the processing systems 410 and 450 are vehicle management systems, the data communicated between the two vehicle management systems may relate to a state of a particular subsystem, such as brakes, flight controls, engines, payload, etc. When data related to a particular subsystem is too large to be transmitted via a single data block, the data related to the particular subsystem may be transmitted via two or more data blocks and the caboose packet may indicate which data blocks were associated with the particular subsystem.

At 431, the second processing system 450 may transmit a caboose packet to the first processing system 410. The caboose packet transmitted by the second processing system 450 may be based on the caboose data structure stored at the second processing system 450. For example, the caboose packet transmitted by the second processing system 450 may include information indicating an order in which data blocks were transmitted from the second processing system 450 to the first processing system 410. Additionally, the caboose packet transmitted from the second processing system 450 may include information indicating content of the data blocks transmitted.

At 432, the first processing system 410 may receive a caboose packet from the second processing system 450. The first processing system 410 may process the caboose packet to determine where in RAM particular blocks reside, and content of the blocks. In a particular embodiment, the first processing system 410 may use the caboose packet received from the second processing system 450 to generate a memory map that maps the data blocks received from the second processing system 450 and stored in RAM to content of the data blocks based on the order of transmission of the data blocks. At 433, the second processing system 450 may receive a caboose packet from the first processing system 410. The second processing system 450 may process the caboose packet received from the first processing system 410 to determine where in RAM each data block resides and to generate a memory map.

At 434, when the first processing system 410 receives a read request requesting particular data, the first processing system 410 may read data blocks corresponding to the particular data from RAM based on the memory map. The first processing system 410 may also piece together the particular data into its original form using the data blocks. Thus, the data blocks received from the second processing system 450 may be stored in the RAM at receive buffer memory locations, and may not be copied or duplicated, until a read request for the particular data is received. When the read request is received, specific data that is requested may be determined and matched against the memory map to determine where in the receive buffer the corresponding data blocks are stored. At that time, the data blocks may be pieced together to form requested data to respond to the read request. Similarly, when the second processing system 450 receives a read request, the second processing system 450 may read data blocks from RAM and piece together the packets into their original form, at 435.

A subsequent cross-channel data link may begin, at 436, after the caboose packets have been exchanged by the processing systems 410 and 450. The processing frame may include two or more cross-channel data link frames. For example, a first cross-channel data link frame may be used for voting data between the first processing system 410 and second processing system 450 to determine particular data to be used during processing by the processing system 410 and 450. A subsequent cross-channel data link frame may be used to exchange data between the processing systems 410, 450 after processing the data. The processing frame may end, at 440, after a last cross-channel data link frame ends, at 438.

Figure 5:
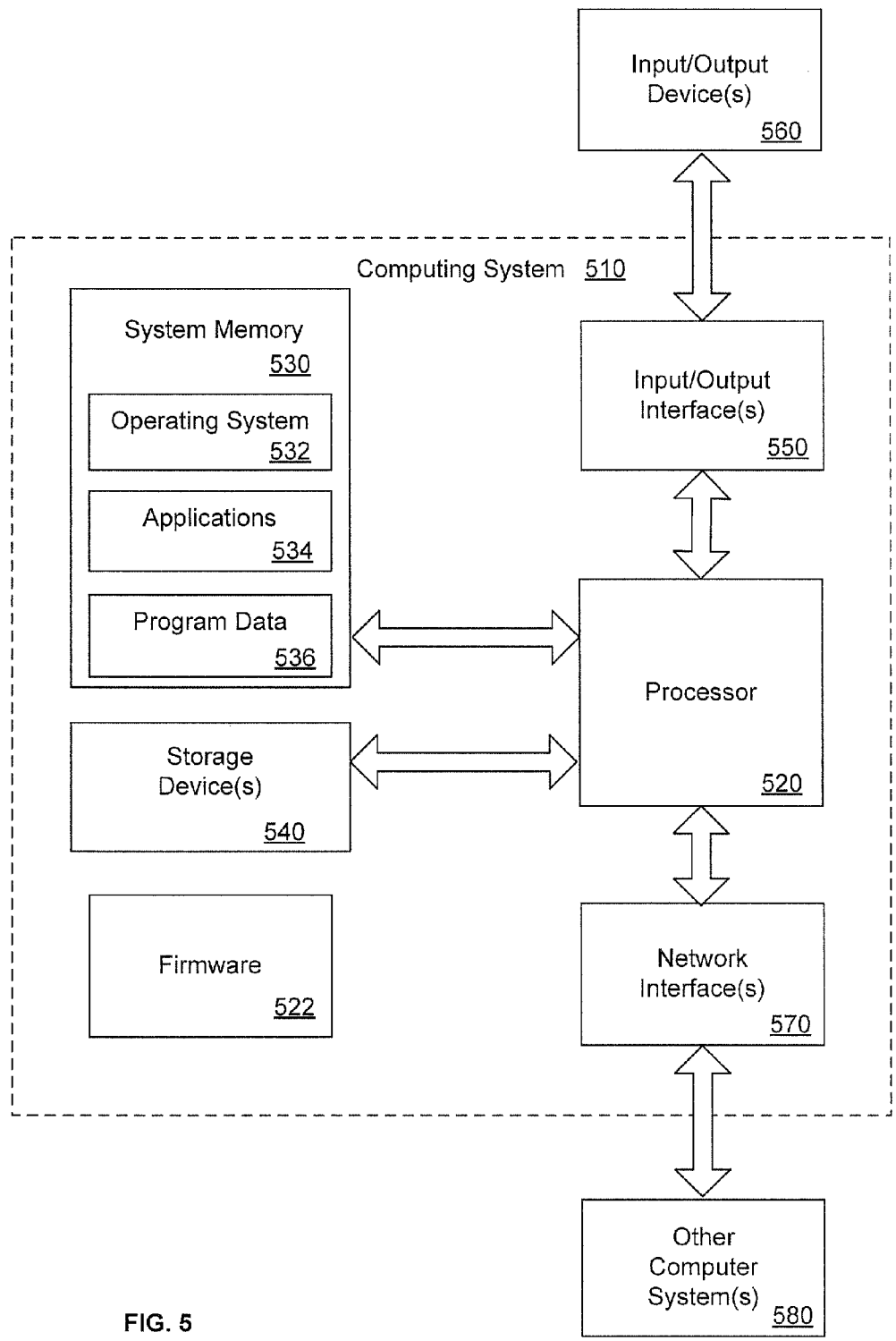
FIG. 5 is a block diagram of a general purpose computing system configured for use in particular embodiments.

FIG. 5 is a block diagram illustrating a particular embodiment of a computer system that may be used to implement one or more processing systems that communicate via a cross-channel data link. In a particular embodiment, one or more of the methods of communication via a cross-channel data link that are disclosed, or portions thereof, may be implemented using processor-readable instructions executable by one or more processors. For example, a computing system 510 may include one or more of the processors, receivers, transmitters, transmission managers, or memory devices, as described with reference to FIGS. 2 and 4. The computing system 510 may be implemented as or incorporated into various other devices or platforms, such as a mobile platform, a communications device, a control system, an avionics system, a vehicle management system, or any other machine capable of executing a set of instructions (sequential or otherwise) that specify actions to be taken by that machine. Further, while the computing system 510 is illustrated as a single computer, the term "system" includes any collection of systems or sub-systems that individually or jointly execute a set, or multiple sets, of instructions to perform one or more computer functions. While FIG. 5 illustrates one embodiment of the particular computing system 510, other computer systems or computing architectures and configurations may be used for carrying out the methods of communication using shared storage described herein.

The computing system 510 includes at least one processor 520. The processor 520 may include a single-chip processor (with one or more processing cores or logical partitions) or multiple processors. In a particular embodiment, the processor 520 is a programmable digital processor that controls operation of the computing system 510. For example, using instructions retrieved from a system memory 530, the processor 520 controls the reception and manipulation of input data and the generation of output data (e.g., to a display or other output device).

The processor 520 may be coupled to the system memory 530. The system memory 530 may include any suitable non-transitory, computer-readable storage media depending on, for example, whether data access is bi-directional or uni-directional, speed of data access desired, memory capacity desired, other factors related to data access, or any combination thereof. The system memory 530 may include various memory devices, such as registers, caches, buffers, volatile memory, and non-volatile memory. The system memory 530 can include operating instructions such as an operating system 532, one or more applications 534, and program data 536 used by the processor 520 to perform functions of the computing system 510.

The computing system 510 may also include storage devices 540 to provide additional data storage capacity. The storage devices 540 may be coupled either bi-directionally or uni-directionally to processor 520. In various embodiments, the storage devices 540 may include non-transitory, computer-readable storage media such as magnetic tape, flash memory, PC-CARDS, portable mass storage devices, optical or holographic storage devices, magnetic or electromagnetic storage devices, and read-only or random access memory devices. Like the system memory 530, the storage devices 540 may include operating instructions (e.g., program code), data, or both.

The processor 520 may be coupled to an input/output interface 550 to enable the computing system 510 to receive input and to provide output to input/output devices 560. Examples of output devices may include display devices, speakers, printers, or other devices that provide an output in a manner that is perceptible by a user (e.g., haptic devices). Examples of input devices may include keyboards, pointing devices, biometric devices, microphones, sensors, or other devices to sense or receive user input or other input. The processor 520 may also be coupled to a network interface 570 (such as a wireless network interface, a modem, an Ethernet interface, or another device to output or receive data from another computer system or other machine). The network interface 570 may enable data communications between the computing system 510 and other computer systems 580. In a particular embodiment, the other computer systems 580 communicate with the computing system 510 via a cross-channel data link.

In a particular embodiment, dedicated hardware may be used to implement at least a portion of the methods of communication via a cross-channel data link disclosed herein. For example, application specific integrated circuits, programmable logic arrays or other hardware devices may be used to implement one or more of the methods, or portions of the methods, disclosed herein. To illustrate, the computing system 510 may include firmware 522 that implements functions associated with communication via the cross-channel data link in a manner that reduces interrupts to the processor 520 and reduces a number of copies of data that are made.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
sending outgoing data in a first outgoing data block from a first processing system to a second processing system;
updating a first data structure at the first processing system, wherein the first data structure indicates an order of transmission of each of a plurality of outgoing data blocks, wherein the plurality of outgoing data blocks includes the first outgoing data block;
in response to an end of a first frame, generating an outgoing caboose packet based on the first data structure, the outgoing caboose packet including information identifying the order of transmission of each of the plurality of outgoing data blocks during the first frame, wherein the outgoing data is generated during a processing frame, and wherein the processing frame includes the first frame and at least one second frame;
sending the outgoing caboose packet from the first processing system to the second processing system, wherein the first frame and the at least one second frame are cross-channel data link frames, and wherein state data is communicated between the first processing system and the second processing system during the first frame;
selecting data to be processed during an interim time period after the end of the first frame and prior to a beginning of the at least one second frame, wherein the data to be processed is selected based on incoming data received from the second processing system during the first frame;
processing the selected data during the interim time period to generate processed data; and
sending the processed data in a second outgoing data block to the second processing system during the at least one second frame.

2. The method of claim 1, further comprising:
receiving incoming data blocks from the second processing system during the first frame; and
as each of the incoming data blocks is received, writing the incoming data block to a memory device of the first processing system without interrupting a processor of the first processing system.

3. The method of claim 2, wherein related incoming data blocks are written to contiguous memory locations of the memory device.

4. The method of claim 2, further comprising receiving an incoming caboose packet from the second processing system after the end of the first frame, wherein the incoming caboose packet includes information identifying an order of transmission of each of the incoming data blocks sent from the second processing system to the first processing system and information descriptive of each of the incoming data blocks.

5. The method of claim 4, further comprising generating a memory map using the incoming caboose packet at the first processing system, wherein the memory map indicates a particular location within the memory device associated with data included in each of the incoming data blocks and wherein the memory map is generated based on the order of transmission of each of the incoming data blocks and based on the information descriptive of each of the incoming data blocks.

6. The method of claim 5, further comprising:
in response to receiving a read request for particular data:
accessing the memory map that identifies a plurality of locations in the memory device associated with the particular data;
assembling the particular data by reading particular incoming data blocks stored at the plurality of locations; and
writing the particular data to a processing memory location.

7. The method of claim 6, wherein the information descriptive of each of the incoming data blocks indicates that the incoming data block includes status data related to a particular subsystem.

8. The method of claim 4, further comprising, in response to a failure of the first processing system, restarting the first processing system using state data received via the incoming data blocks and the incoming caboose packet.

9. A system, comprising
a first processing system configured to be communicatively coupled to a second processing system, the first processing system including:
a first processor; and
a first memory storing instructions that, when executed by the first processor, cause the first processor to:
send outgoing data in a first outgoing data block from a first processing system to a second processing system;
update a first data structure at the first processing system, wherein the first data structure indicates an order of transmission of each of a plurality of outgoing data blocks, wherein the plurality of outgoing data blocks includes the first outgoing data block;
in response to an end of a first frame, generate an outgoing caboose packet based on the first data structure, the outgoing caboose packet including information identifying the order of transmission of each of the plurality of outgoing data blocks during the first frame, wherein the outgoing data is generated during a processing frame, and wherein the processing frame includes the first frame and at least one second frame;
send the outgoing caboose packet from the first processing system to the second processing system, wherein the first frame and the at least one second frame are cross-channel data link frames, and wherein state data is communicated between the first processing system and the second processing system during the first frame;
select data to be processed during an interim time period after the end of the first frame and prior to a beginning of the at least one second frame, wherein the data to be processed is selected based on incoming data received from the second processing system during the first frame;
process the selected data during the interim time period to generate processed data; and
send the processed data in a second outgoing data block to the second processing system during the at least one second frame,
wherein the second processing system includes:
a second processor;
a receive buffer, the receive buffer including a plurality of receive buffer memory locations;
a receiver configured to:
receive incoming data blocks from the first processing system, wherein the incoming data blocks correspond to the plurality of outgoing data blocks sent by the first processing system;
write each of the incoming data blocks to a particular receive buffer memory location; and
receive, from the first processing system, the caboose packet; and a memory mapping module to generate, based on the caboose packet, a map associating a particular receive buffer memory location of the plurality of receive buffer memory locations with data included in each of the incoming data blocks.

10. The system of claim 9, wherein in response to a read request for particular data, the second processor is configured to:
  access the memory map to identify one or more receive buffer memory locations corresponding to the particular data; and
  copy the particular data from the one or more identified receive buffer memory locations to a processor memory of the second processing system.

11. The system of claim 10, wherein incoming data blocks are not copied to the processor memory of the second processing system until a read request is received.

12. The system of claim 9, wherein the second processing system includes:
  a transmitter adapted to packetize additional outgoing data into additional outgoing data blocks and to send the additional outgoing data blocks to the first processing system, and
  a transmission manager configured to update a second caboose data structure when an additional outgoing data block is transmitted, wherein the second caboose data structure includes information indicating an order in which each of the additional outgoing data blocks was transmitted.

13. The system of claim 12, wherein the transmitter sends a second caboose packet based on the second caboose data structure from the second processing system to the first processing system when a second frame ends, wherein the second caboose packet includes the information indicating the order in which each of the additional outgoing data blocks was transmitted.

14. The system of claim 9, wherein the receiver receives the incoming data blocks and writes the incoming data blocks to the receive buffer memory locations without interrupting the second processor.

15. A moveable platform, comprising:
  a plurality of platform management systems; and
  a cross-channel data link that facilitates communication of state information between the platform management systems;
  wherein a first platform management system is configured to:
    send first data blocks to at least one second platform management system via the cross-channel data link;
    update a first data structure at the first platform management system, wherein the first data structure indicates an order of transmission of each of the first data blocks;
    in response to an end of a first frame, generate a first caboose packet based on the first data structure, wherein outgoing data included in the first data blocks is generated during a processing frame, wherein the processing frame includes the first frame and at least one second frame, wherein the first frame and the at least one second frame are cross-channel data link frames, and wherein state data is communicated between the first platform management system and the at least one second platform management system during the first frame;
    send the first caboose packet via the cross-channel data link to the at least one second platform management system when the first frame ends, the first caboose packet including information indicating an order of transmission of each of the first data blocks and information descriptive of content of each of the first data blocks; and
    select data to be processed during an interim time period after the end of the first frame and prior to a beginning of the at least one second frame, wherein the data to be processed is selected based on data received from the second platform management system during the first frame,
  wherein the at least one second platform management system is configured to:
    receive the first data blocks from the first platform management system and store the first data blocks to memory locations of a receive buffer of the at least one second platform management system; and
    receive the first caboose packet from the first platform management system and to map the memory locations of the receive buffer of the at least one second platform management system to the content of each of the first data blocks based on the first caboose packet.

16. The moveable platform of claim 15, wherein the at least one second platform management system does not reconstruct the content of any of the first data blocks until a read request for the content is received.

17. The moveable platform of claim 15, wherein the at least one second platform management system is further configured to:
  send second data blocks to the first platform management system via the cross-channel data link during the first frame; and
  send a second caboose packet via the cross-channel data link to the first platform management system when the first frame ends, the second caboose packet including information indicating an order of transmission of each of the second data blocks and information descriptive of content of each of the second data blocks; and
  wherein the first platform management system is further configured to:
    receive the second data blocks from the at least one second platform management system and store the second data blocks to memory locations of a receive buffer of the first platform management system; and
    receive the second caboose packet from the at least one second platform management system and use the second caboose packet to map the memory locations of the receive buffer of the first platform management system to the content of each of the second data blocks.

18. The moveable platform of claim 15, wherein the moveable platform comprises an unmanned vehicle and the plurality of platform management systems provide onboard vehicle control to the unmanned vehicle.

* * * * *